United States Patent Office 3,378,022
Patented Apr. 16, 1968

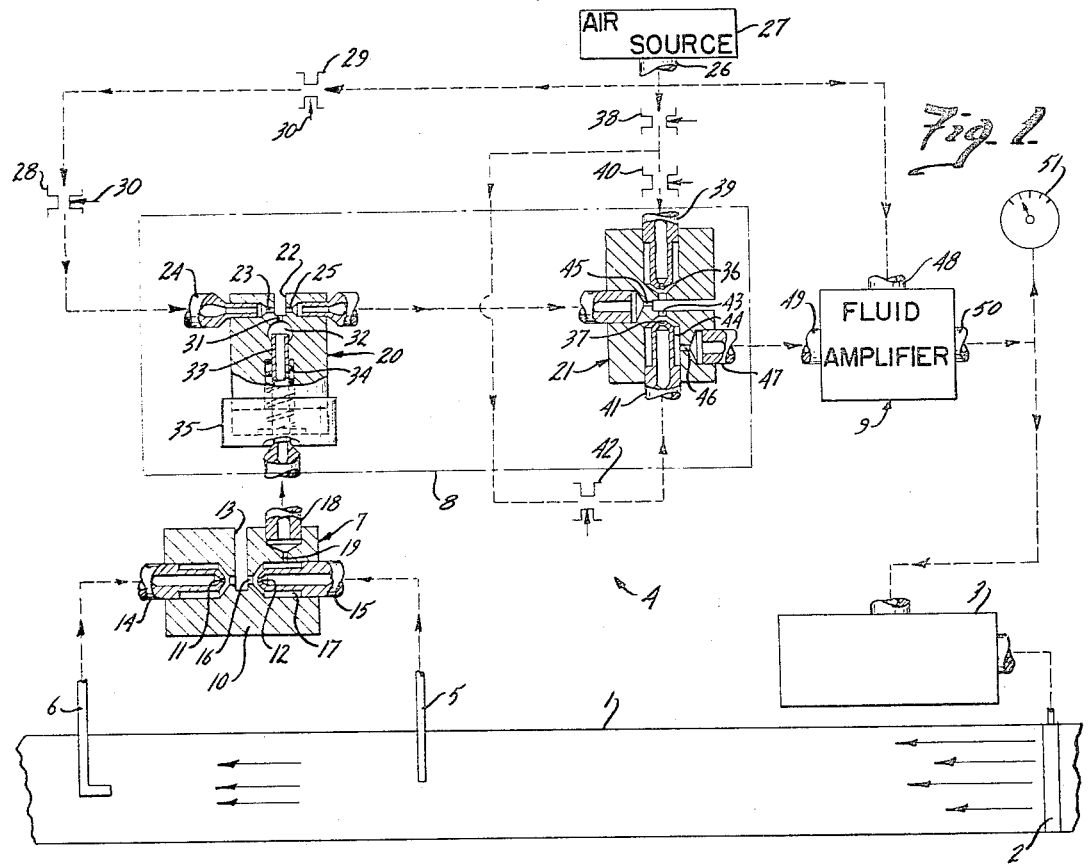
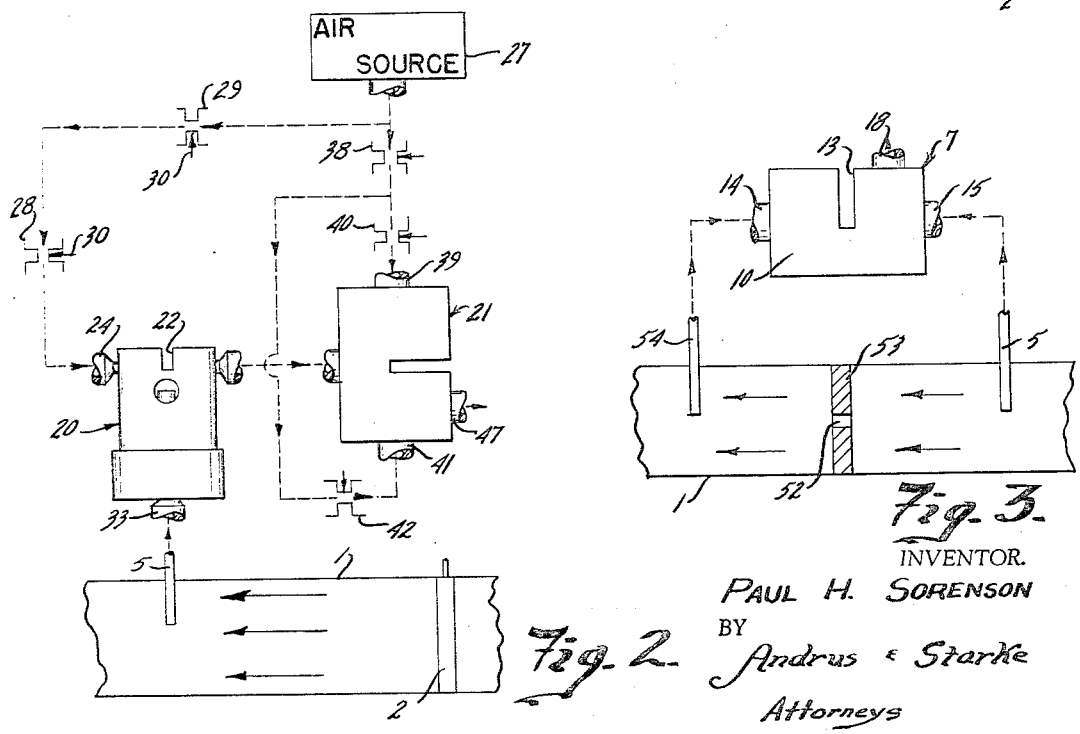

1

3,378,022
FLUID FLOW SENSING SYSTEM
Paul H. Sorenson, West Allis, Wis., assignor to Johnson
Service Company, Milwaukee, Wis., a corporation of
Wisconsin
Filed Apr. 6, 1964, Ser. No. 357,558
6 Claims. (Cl. 137—81.5)

This invention relates to a fluid flow sensing or control system and particularly to a pneumatic air flow control device which is adapted for application in the detection of pressure signals which are of a relatively low level and under severe environmental conditions of vibration, shock, widely varying temperatures and the like.

In air flow systems and the like, it is often desirable to have the duct pressure or flow volume automatically controlled or in the alternative to obtain an indication or signal of any variation therein. The control system may be interconnected to sense either the static and/or the velocity pressures of the system and actuate a control or indicating device accordingly. For example, in velocity control systems, a pressure signal transducer employing a slack diaphragm construction may be advantageously employed to provide a direct acting instrument producing an output signal proportional to the velocity of the flow in a duct. In such systems, a static pressure probe and a total pressure probe are inserted in the duct and pressure signals are impressed on opposite sides of a slack diaphragm which positions a valve port to open and close a control stream port. The probes are connected respectively to a high pressure chamber and a low pressure chamber having the diaphragm as a common dividing wall which is preloaded to provide a balanced control system. The control stream port may be connected to actuate an indicating or alarm unit or to a control pressure connection in response to variation in the differential pressure impressed on the diaphragm and the resulting diaphragm movement.

Although certain pneumatic diaphragm relays can be constructed with a high degree of ruggedness and reliability, a slack diaphragm unit must be a relatively thin, fragile member of a relatively large area in order to provide the sensitivity necessary to distinguish between the opposing pressures and as a result is a fragile and delicate instrument. Although such devices are generally highly satisfactory under many circumstances wherein an inexpensive and accurate controller is needed, certain disadvantages arise in installations where the unit is subjected to vibration and shock forces, widely varying temperatures and similar phenomena.

The present invention is particularly directed to a pure fluid sensing system for establishing a pneumatic output signal proportional to the characteristics of a flowing fluid in a line or duct. In accordance with the present invention, the probes are inserted into the duct to provide controlled signal streams which are interconnected directly into a pure fluid amplifying system with the control signal or signals being established directly by the flow in the duct. The pure fluid amplifying device takes the control signal and provides an amplified output stream which can be interconnected to either directly operate a suitable load or can be interconnected through any suitable high gain amplifying buffer stage to match the amplified output to the power level requirements of the load.

The amplifying system preferably employs a three terminal or transverse acting fluid amplifier feeding into a pure fluid impact modulator shown and described in the copending applications of Bjorn G. Bjornsen and Thomas J. Lechner, Jr., entitled, Fluid Control which was filed on Sept. 30, 1963, with Ser. No. 312,550, now Patent No. 3,279,489, and Fluid Control Apparatus, which was filed

2 on November 1, 1963, with Serial No. 320,680, now Patent No. 3,272,215, and which are assigned to a common assignee with the present application. The use of the three terminal device in combination with the impact modulator provides a relatively high gain and thereby produces a high pressure output stream or signal while minimizing the total supply air employed. If the air supply availability is of little or no consequence, a pair of impact modulators might be employed.

In a system providing a velocity responsive or proportional control, the static pressure probe and the total pressure probe would be connected in the duct and interconnected to opposite inputs of the impact modulator to directly establish the opposing power streams as a result of the flow from the duct through the respective probes. The output of the impact modulator would provide a pure fluid signal proportional to the velocity pressure which in turn would be fed to the three terminal device.

In accordance with a preferred construction of the present invention, the amplifying devices are separately connected to a supply pressure source through individual lines including suitable restrictors for accurate control of the fluid pressures fed to the respective systems and thereby providing a preselected interaction characteristic.

The present invention provides a highly reliable and long life flow sensing means for sensing small fluid pressure signals and creating operating or indicating signals under severe environmental conditions which adversely affect the fragile and sensitive instruments normally required.

The drawing furnished herewith illustrates a preferred method of carrying out the invention and clearly illustrates the advantages and features heretofore discussed as well as others which will be clear from the accompanying description of the drawing.

In the drawing:

FIG. 1 is a schematic flow diagram showing a velocity flow responsive control system interconnected to automatically control the velocity or the flow in a duct;

FIG. 2 is a view similar to FIG. 1 of a portion of a system illustrating a static pressure sensing system; and FIG. 3 is a partial view similar to FIG. 1 illustrating a monitoring pickup system responsive to the static pressure drop across a metering orifice.

Referring to the drawing and particularly to FIG. 1, a portion of an air duct 1 is shown having a control damper 2 adjacent the inlet end thereof. The position of the damper 2 controls the air flow through the duct 1. A pneumatic damper operator 3 is diagrammatically shown coupled to the damper 2 for automatic positioning of the damper 2 for controlling the air flow in accordance with a pneumatic control signal from a velocity responsive control system 4 constructed in accordance with the present invention. A static pressure tubular probe 5 and a total pressure tubular probe 6 are shown mounted with the respective pickup ends disposed within the duct to the discharge side of the damper 2. Probes 5 and 6 may be of any suitable or well known construction which provides signals proportional to the static pressure and the total pressure, respectively, and which will establish proportional fluid control streams from fluid in duct 1. In accordance with the present invention, the signal streams from the probes 5 and 6 are interconnected into the control system 4 without the necessity of a transducer for establishing a pneumatic output signal proportional to the difference between the two pressures at probes 5 and 6; i.e., the differential pressure therebetween. The output signal is applied to actuate the valve operator 3 and correspondingly position the damper 2 to maintain a selected differential pressure.

The illustrated control system 4 forming the subject matter of the present invention includes three basic components: a direct impact modulator 7 constituting a sensing unit, a two stage pure fluid amplifier section 8 for increasing the low level signal of modulator 7 and a coupling or buffer amplifier 9 for matching the output of amplifier section 8 to the load or actuator 3. Briefly, modulator 7 is connected to probes 5 and 6 and produces a proportionate fluid signal which is amplified by amplifier section 8. The buffer amplifier 9 modifies the amplified fluid signal from amplifier 8 in accordance with the pressure levels and power requirements of the actuator 3.

The impact modulator 7 which forms a part of the invention is fully described in the previously referred to copending application Ser. No. 320,680 of Bjornsen et al. and is therefore diagrammatically shown and briefly described hereinafter to the extent necessary to clearly understand the present invention. The illustrated impact modulator 7 includes a body portion 10 having a pair of opposed orifices 11 and 12 to opposite sides of a reference recess 13 and connected respectively to the probes 5 and 6 by suitable conduits or lines 14 and 15. A control orifice 16 is aligned with orifices 11 and 12 in an intermediate wall defining an output chamber 17 encircling the inner end of the passageway or conduit 15 to orifice 12. The opposed orifices 11 and 12 establish a pair of impacting streams which interact within the area of the control orifice 16 and establish an output signal stream in an output signal line 18 connected to the output chamber 17 by passageway 19.

As more fully developed in the noted application, the opposing streams established by the probes 5 and 6 and related orifices 11 and 12 create an impacting balance position dependent on the relative strength of the two streams. Generally, the balance occurs within orifice 16 and creates a signal within the output chamber 17 proportional to the differential stream pressures. For example, as the stream from orifice 11 increases in strength, the balance position moves toward the output chamber and increases the pressure within the output chamber. This pressure signal creates the signal stream in the output signal passageway 19 which is proportional to the differential strength of the interacting streams created by the probes 5 and 6 and which is fed as a control signal to the first stage of the amplifier section 8.

The two-stage amplifier section 8 is a pure fluid amplifier illustrated as including a three terminal modulator 20 and a transverse impact modulator 21.

Modulator 20 is generally constructed in accordance with the teaching of the previously referred to application of Bjornsen et al., Ser. No. 312,550. The illustrated three terminal modulator 20 generally includes a body portion having a reference chamber 22 formed by a recess or slot in the top wall thereof with an input orifice 23 in one side wall of the chamber 22. An air input line 24 is connected to orifice 23. An output orifice 25 is formed in the opposite wall of the chamber 22 and a fluid stream of air or other suitable fluid is established from orifice 23 to orifice 25. Input line 24 is connected to a main supply pressure line 26 which is connected to a suitable air supply 27 to create the stream between orifices 23 and 25. Restrictors 28 and 29 are connected in series in the input line 24. Each of the restrictors 28 and 29 may be a presettable or adjustable device, shown diagrammatically by arrow 30, to respectively provide coarse and fine adjustment of the stream strength. Generally, the restrictors 28 and 29 will be preset at the factory to provide the necessary operating ranges although field adjustment can be made if desired or necessary.

A control orifice 31 is formed in the base of the reference chamber 22 and terminates in a control reference chamber 32. An adjustable nozzle 33 is mounted within an opening or passageway and terminates with chamber 32 to supply a stream to orifice 31.

Nozzle 33 is held in position by a compression coil spring 34 which encircles the nozzle within the body portion 20 and acts between an inner recess base and a flange on nozzle 33 which is positioned by an outer nut 35 threadably secured to the body portion of modulator 20.

The adjustable nozzle 33 is connected to the output signal line 18 of the impact modulator 7 to create a control signal stream which engages the side of the stream between orifices 23 and 25. The control signal stream is proportional to the output of the impact modulator 7 and deflects the main stream between orifices 23 and 25 in accordance with the strength thereof.

The output orifice 25 of the three terminal modulator 20 creates a control stream which is connected to form the control signal to impact modulator 21.

The impact modulator 21 constitutes a second amplifying stage and generally corresponds in construction to modulator 7. Modulator 21 includes a pair of main supply orifices 36 and 37 similarly formed in the opposite sides of a reference chamber. A common air line is connected to the pressure line 26 and includes an adjustable restrictor 38 to reduce the pressure to a selected operating level. A first input line 39 terminating in the main supply orifice 36 is connected to the common supply line and includes a fine adjustment restrictor 40. A line 41 terminating in the supply orifice 37 includes a restrictor 42 and is similarly interconnected to the common supply line. The restrictors 40 and 42 are preset to establish opposed impacting streams within the area of a control orifice 43 in the wall defining an output chamber 44, as in the impact modulator 7. Modulator 21 thus operates with fixed opposed streams and includes a transverse input signal orifice 45 in the base of the reference chamber to provide a transverse deflecting stream engaging the side of the stream from orifice 36 to orifice 37. The signal orifice 45 is connected to the output orifice 25 of the three terminal modulator 20 such that a transverse deflecting stream is formed by the output stream of modulator 20 to form a transverse impact modulator action rather than the direct acting modulator action of modulator 7. The stream deflects the corresponding impacting stream from orifice 36 with respect to the control orifice 43. As a result, that portion of the impacting stream opposing and interacting with the impacting stream from orifice 37 is directly related to the strength of the signal from the three terminal modulator 20. The output of the impact modulator 21 as it appears at the output orifice 46 and line 47 from output chamber 44 is therefore also proportional to the differential pressures or strengths of the stream established by probes 5 and 6.

The amplified output is connected to the relay 9, which as previously noted, may be of any well known construction adapted to correlate the amplified output to the power requirements and operating level of the valve operator 3. Relay 9 may be the usual diaphragm type pneumatic unit, an impact modulator or other suitable unit which provides a pneumatic output signal suitable for actuation of operator 3. Relay 9 is therefore shown diagrammatically in the flow circuit by a properly labeled block carrying the legend fluid amplifier. An output pressure supply line 48 is connected to the common pressure line 26 and an input control line 49 is connected to the output line of modulator 20. The output of the relay 9 appears at an output line 50 which is shown connected to operate the valve operator 3 and a suitable indicating device 51. The relay 9 may include a feedback line which adjusts its gain and thereby provides adjustment of the output signal in accordance with the load characteristics.

The operation of the illustrated embodiment of the invention may be briefly summarized as follows.

The pneumatic pressure probe 5 establishes a control signal stream directly proportional to the static pressure in the duct 1 and the total pressure probe 6 establishes an opposing signal stream directly proportional to the total pressure in the stream in duct 1. The two signal streams constitute the main or power streams between orifices 11 and 12 of the impact modulator 7 and interact to establish the output stream at line 18 which is proportional to the difference in the strength of the two streams. This difference is also proportional to the velocity pressure. The proportional signal is fed via line 18 to the three terminal modulator 20. The adjustable nozzle 33 is preset to provide a selected proportional control signal stream providing proportional deflection of the high pressure or main stream between orifices 23 and 25. The three terminal modulator 20 minimizes the total air flow employed and further provides a relatively fine adjustment of the set point about which the amplifying system operates. If the set point setting of the installation is not critical and air consumption is not of substantial significance, the modulator 20 may advantageously be constructed as a transverse impact modulator similar to impact modulator 21 which provides very substantial gain.

The output of the three terminal modulator 20 constitutes the transverse control signal to the impact modulator 21 and forms the transverse control stream therein. The stream from orifice 35 is deflected with respect to the control orifice 43 such that the output of the modulator 20 at line 47 is proportional to variation in the strength of the stream from orifice 45. Modulator 21 provides a high gain of the control signal which is fed to actuate the relay 9.

The relay 9 acts as a buffer stage for adapting the output of the impact modulator 21 to the particular system level and power requirements of the operator 3. Where the operator 3 is compatible with the output signal of the impact modulator 21, the buffer stage relay 9 can of course be completely eliminated.

Referring particularly to FIG. 2, a similar system is illustrated for controlling the static pressure within a duct. As the systems are very similar, the corresponding elements in FIGS. 1 and 2 are similarly numbered. In FIG. 2, only the static pressure probe 5 is employed and it is connected directly to the adjustable nozzle 33 of a three terminal modulator 20 of the amplifying section 8. Probe 5 establishes a control signal stream which is adjusted to deflect a power stream in the three terminal modulator 20 and thus provides a transverse signal stream to the impact modulator 21 directly proportional to the static pressure of the air in the duct 1. The output in turn may be amplified by relay 9 to provide suitable operation of a load such as a valve operator 3, not shown in FIG. 2, in accordance with any change in the static pressure.

A further embodiment of this invention is shown in FIG. 3 in which a static pressure system continuously senses the static pressure drop across a metering orifice 52 in duct 1. Corresponding elements in FIGS. 1 and 3 are similarly numbered for simplicity of explanation.

Referring particularly to FIG. 3, a suitable damper or plate 53 spans the duct 1 and includes the metering orifice 52. The pressure probe 5 is shown mounted to the upstream side of the metering orifice 52. A similar static probe 54 is mounted to the opposite end downstream side of the metering orifice 52. The probes 5 and 54 are connected to the opposite input supply lines 14 and 15 of the impact modulator 7 and thus provide a pair of opposing supply streams in accordance with the respective static pressures. The output of the impact modulator 7 is therefore proportional to the difference of the two static pressures and provides a measure of the pressure drop through the metering orifice. The output stream from the impact modulator 7 may be connected to any suitable device for indicating, monitoring, actuating or the like after suitable amplification; for example, as shown in FIG. 1.

Although the present invention has been described in a preferred circuitry including many novel features, in its broadest aspects the present invention provides a pure fluid system wherein a low level control signal stream is established directly from a flow to be controlled and is increased to an operating level by a pure fluid amplifying device. This eliminates the many severe problems encountered in the commercially practical slack diaphragm type units which have heretofore been universally or widely employed in pneumatic control systems particularly dealing with very low pressure signals.

The present invention provides an improved control system wherein a control stream is formed by the flow in the duct to provide a pure fluid sensing system for use in environments characterized by widely varying temperatures, shock and vibration conditions and the like. The terminology "control" is employed in the claims in its broad sense which includes indicating, regulating, monitoring and the like.

Various modes of carrying out the invention are contemplated as being within the scope of the following claims particularly pointing out and distinctly claiming the subject matter which is regarded as the invention.

I claim:

1. In a velocity responsive control system for creating a control signal in accordance with the velocity of flow at a selected position in a duct,
   a static pressure probe having means to mount the probe within the duct and establishing a signal stream proportional to the static pressure,
   a total pressure probe having means to mount the probe within the duct adjacent the static pressure probe and establishing a signal stream proportional to the total pressure,
   an impact modulator having a pair of spaced and aligned opposed orifices connected respectively to the static pressure probe and to the total pressure probe to establish a pair of opposed impacting streams and a control orifice forming a part of an output chamber with one of said opposed impacting streams entering the control orifice from within the output chamber, said control orifice being aligned with said opposed orifices and having the impacting streams establishing an impact position with respect to said control orifice and creating an output stream in an output orifice from the output chamber proportional to the difference in the strengths of the two impacting streams.

2. The velocity responsive control system of claim 1 having,
   a pure fluid amplifying means including at least a pair of input orifices a first of which defines a control stream interacting with a main power stream defined by the second thereof and producing an output signal stream at an output orifice, said first input orifice being connected to the output of the impact modulator whereby the output stream from the impact modulator constitutes the control signal stream.

3. The velocity responsive control system of claim 1 having,
   a three terminal modulating device including an input orifice for creating a main stream and a spaced opposed output orifice for collecting the main stream and a deflection orifice between the input orifice and the spaced output orifice for directing a stream into deflecting engagement with one side of the main stream, said deflection orifice being connected to the output orifice of said impact modulator,
   a supply line connected to the input orifice for connection to a pressurized fluid source and including restrictors for fine adjustment of the stream strength,
   a transverse impact modulator having a pair of opposed spaced and aligned main stream orifices for producing a pair of opposed impacting streams and an aligned control orifice therebetween within which the impacting streams interact, said control orifice being formed in an output chamber and having a transverse control orifice for deflecting one of said impacting streams, said transverse control orifice being connected to the output orifice of the three terminal modulating device,
   a common supply line for connection to the pressurized fluid source and having a coarse adjustment restrictor therein, an input line connecting the common supply line to one of the opposed orifices of the transverse impact modulator and having a fine adjustment restrictor therein, and an input line connecting the common supply line to the second of the opposed orifices of the transverse impact modulator and having a fine adjustment restrictor therein.

4. In a static pressure responsive control system for sensing the static pressure at a selected position in a duct carrying flowing fluid, a static pressure probe having means to mount the probe within the duct and establishing a signal stream proportional to the static pressure, a pure fluid modulator having a main stream orifice connected to an air supply means to form a main stream and a signal orifice connected to the static pressure probe to direct the signal stream of the probe into engagement with the main stream to create an output stream proportional to the strength of the signal stream, and an impact modulator with a pair of spaced and aligned opposed power stream orifices producing streams interacting within a control orifice disposed between said power stream orifices, said control orifice forming a part of an output chamber with one of said streams entering the control orifice from within the chamber and producing an output at an output orifice, and a transverse control orifice connected to the output of the pure fluid modulator and disposed between the control orifice and the power stream orifice to variably deflect the corresponding stream to produce an amplified output signal proportional to the signal stream from the static pressure probe means.

5. In an air sensing controller for sensing fluid flow in a duct in accordance with the velocity of flow at a selected position in the duct, a static pressure probe having means to mount the probe within the duct and establishing a signal stream proproportional to the static pressure, a total pressure probe having means to mount the probe within the duct adjacent the static pressure probe and establishing a signal stream proportional to the total pressure, an impact modulator having a pair of spaced and aligned opposed orifices connected respectively to the static pressure probe and to the total pressure probe to establish a pair of opposed impacting streams and a control orifice defining an output chamber with one of said opposed impacting streams entering the control orifice from within the output chamber, said control orifice being aligned with said opposed orifices and having the impacting streams establishing an impact position with respect to said control orifice and an output stream proportional to the difference in the strengths of the two impacting streams, a three terminal modulator having a main stream orifice in opposed spaced relation to an output orifice and a control orifice interposed at a right angle therebetween and having an adjustable nozzle aligned with the control orifice, said nozzle being connected to the output of the impact modulator, an impact modulator having a pair of opposed spaced and aligned main stream orifices and a control orifice interposed therebetween, said control orifice being formed in an output chamber between the control orifice and a first of the stream orifices and said chamber having an output orifice, a transverse signal orifice disposed between the control orifice and the opposite stream orifice, said signal orifice being connected to the output orifice of the three terminal modulator, a main air supply line for supplying control air at a selected pressure, and input lines including restrictor means for separately connecting the supply line to the main stream orifice of the three terminal modualtor and to the main stream orifices of the second impact modulator.

6. In an air flow controller for controlling fluid flow in a duct in accordance with the velocity of flow at a selected position in the duct, a static pressure probe having means to mount the probe within the duct and establishing a signal stream proportional to the static pressure a total pressure probe having means to mount the probe within the duct adjacent the static pressure probe and establishing a signal stream proportional to the total pressure, an impact modulator having a pair of spaced and aligned opposed orifices connected respectively to the static pressure probe and to the total pressure probe to establish a pair of opposed impacting streams and a control orifice defining an output chamber with one of said opposed impacting streams entering the control orifice from within the output chamber said control orifice being aligned with said opposed orifices and having the impacting streams establishing an impact position with respect to said control orifice and an output stream proportional to the difference in the strengths of the two impacting streams, a three terminal modulator having a main stream orifice in opposed spaced relation to an output orifice and a control orifice interposed at a right angle therebetween and having an adjustable nozzle aligned with the control orifice, said nozzle being connected to the output of the impact modulator, a main air supply line for supplying control air at a selected pressure, an input line including a pair of presettable restrictors connecting the supply line to the main stream orifice, a transverse impact modulator having a pair of opposed spaced and aligned stream orifices and a control orifice aligned with the stream orifices and interposed therebetween and forming a part of an output chamber, said chamber having an output orifice, and a transverse signal orifice connected to the output orifice of the three terminal modulator, a coupling line including a restrictor connected to the supply line, a pair of input lines each having a restrictor and being connected one each to the stream orifices of the transverse impact modulator and separately connected to the coupling line, a high gain pneumatic amplifier having a control signal input means connected to the output orifice of the transverse impact modulator and having an output, and a flow adjusting means including a pneumatic operator connected to the output of the pneumatic amplifier and a flow control unit for mounting in the duct.

References Cited

UNITED STATES PATENTS

| 3,122,165 | 2/1964 | Horton | 137—81.5 |
| 3,209,774 | 10/1965 | Manion | 137—81.5 |
| 3,234,955 | 2/1966 | Auger | 137—81.5 |
| 3,238,959 | 3/1966 | Bowles | 137—81.5 |
| 3,238,960 | 3/1966 | Hatch | 137—81.5 |

FOREIGN PATENTS 1,318,907   1/1963   France.

M. CARY NELSON, *Primary Examiner.*

W. R. CLINE, *Assistant Examiner.*